United States Patent [19]
Dupuy

[11] Patent Number: 5,433,038
[45] Date of Patent: Jul. 18, 1995

[54] VEHICLE WINDOW WEATHER SEALING STRIP WITH RETAINING CLIP

[75] Inventor: Ronald E. Dupuy, Wabash, Ind.
[73] Assignee: GenCorp Inc., Fairlawn, Ohio
[21] Appl. No.: 161,964
[22] Filed: Dec. 3, 1993
[51] Int. Cl.6 .............................................. E05F 11/38
[52] U.S. Cl. ...................................... 49/377; 49/492.1
[58] Field of Search ...................... 49/374, 377, 475.1, 49/489.1, 492.1, 493.1, 496.1

[56] References Cited

U.S. PATENT DOCUMENTS

| | | |
|---|---|---|
| 2,091,747 | 8/1937 | Accardi . |
| 2,184,186 | 12/1939 | Geyer . |
| 2,211,257 | 8/1940 | Deisley et al. . |
| 2,622,286 | 12/1952 | Beck . |
| 2,647,792 | 8/1953 | Flemming . |
| 2,655,698 | 10/1953 | Chalik et al. . |
| 2,719,343 | 10/1955 | Harris . |
| 2,787,033 | 4/1957 | Peckham et al. . |
| 2,902,732 | 9/1959 | Beck et al. . |
| 2,909,819 | 10/1959 | Fernberg . |
| 2,938,245 | 5/1960 | Sehn . |
| 2,952,053 | 9/1960 | Frehse . |
| 3,074,754 | 1/1963 | Komenda . |
| 3,139,784 | 7/1964 | Moorman . |
| 3,167,826 | 2/1965 | Watzl et al. . |
| 3,218,680 | 11/1965 | Deal et al. . |
| 3,378,958 | 4/1968 | Parks et al. . |
| 3,411,245 | 11/1968 | Sturtevant . |
| 4,089,134 | 5/1978 | Koike .............................. 49/377 X |
| 4,157,634 | 6/1979 | Coulston . |
| 4,649,669 | 3/1987 | Okamoto et al. . |
| 4,696,128 | 9/1987 | Fukuhara ........................ 49/492.1 |
| 4,864,774 | 9/1989 | Onishi et al. ................. 49/492.1 X |
| 5,085,005 | 2/1992 | Yasukawa et al. . |
| 5,096,757 | 3/1992 | Chen . |
| 5,267,415 | 12/1993 | Vaughan ............................. 49/377 |

*Primary Examiner*—Jerry Redman
*Attorney, Agent, or Firm*—Robert F. Rywalski; Daniel J. Hudak

[57] ABSTRACT

A weather sealing strip for sealing the opening between the periphery of a vehicle window opening and a slidable window pane includes an elongate, relatively rigid, thermoplastic backbone having at least one integrally attached thermoplastic fastening means which is adapted for insertion into an opening or slot of a sheet metal member forming the periphery of a window opening, and includes a relatively flexible, elastomeric, sealing element joined to the thermoplastic backbone. The sealing strip reduces the number of separate components and the number of steps needed to mount a sealing strip to a vehicle window opening.

22 Claims, 5 Drawing Sheets

VEHICLE WINDOW WEATHER SEALING STRIP WITH RETAINING CLIP

FIELD OF THE INVENTION

The invention relates to a weather sealing strip for sealing the opening between the periphery of a vehicle window opening and a slidable window pane and, more particularly, to a belt-line weather sealing strip having integral retaining means for attaching the sealing strip to openings in a sheet metal member defining the window opening of an automotive vehicle door.

BACKGROUND OF THE INVENTION

Conventional weather sealing strips are generally extruded and separate retainer clips are used for attaching the extruded weather sealing strips to the periphery of a vehicle window opening. The retaining clips are usually designed so that they can be mounted onto the periphery of the window opening by inserting a portion of the retaining clip into an aperture or slot pierced into the sheet metal defining the window opening. The prior art retainer clips are usually made of a springy, resilient material having separate deformable means for securely retaining a weather sealing strip and for locking the retainer clips into the openings provided in the sheet metal defining the window opening. Conventional extruded sealing strips which are attached to the window opening with separate retainer clips have the disadvantages of requiring the manufacturing, procurement, inventorying and assembly of a plurality of separate components. Another disadvantage with extruded sealing strips is that they generally require additional detail such as end caps which are generally used to cover the exposed ends of an extruded sealing strip to provide for better aesthetics.

U.S. Pat. No. 2,719,343 to Harris, U.S. Pat. No. 2,787,033 to Peckham et al., and U.S. Pat. No. 3,167,826 to Watzl, each relate to automotive weather sealing assemblies having metal wire fastening means which are partially embedded within a flexible sealing strip and with a portion of the metal fastening means protruding outwardly from the sealing strip. Each protruding portion of the fastening means is shaped such that it can be pressed through a hole in a vehicle door frame to fasten the weather strip to the door frame. While the aforementioned patents disclose weather sealing strips having integral retaining means thereby overcoming some of the disadvantages associated with conventional extruded weather sealing strips which are fastened to the window opening with separate retainer clips, they have associated therewith a more difficult fabrication process: first, the separate fabrication of the metal fastening means, and then the incorporation of the metal fastening means into a finished weather sealing strip having integral fastening means. This is achieved either by a complicated coextrusion process or by appropriately positioning the retaining means in a mold cavity and then molding the sealing strip over the retaining means. In either case, the previously disclosed weather sealing strips having metal retaining means embedded therein require a fairly complicated, multi-step fabrication process which is relatively expensive due to the required equipment, labor, or combination thereof.

U.S. Pat. No. 3,139,784 to Moorman, and U.S. Pat. No. 3,218,680 to Deal et al., each relate to sealing strips having plastic, stud-like fasteners embedded therein. These sealing strips require separately formed fasteners which are subsequently embedded in the sealing strip and, therefore, have associated therewith substantially the same disadvantages encountered with the sealing strips having metal wire fastening means partially embedded therein. Specifically, the sealing strips having plastic, stud-like fasteners require separate fabrication operations for the sealing strip and the stud-like fasteners, followed by an assembly operation for embedding the stud-like fasteners into the sealing strip. The manufacture of such fasteners therefore requires a relatively complicated multiple-step process which is relatively expensive because of the amount of equipment and labor required.

SUMMARY OF THE INVENTION

A primary object of the present invention is to provide a one-piece sealing strip having integrally formed fastening means to simplify fabrication by reducing the number of steps and the amount of equipment needed, and to simplify mounting of the sealing strip to a vehicle window opening by reducing the number of components required to attach the sealing strip to the vehicle window opening.

Another important object of the invention is to provide a sealing strip having integral fastening means capable of being easily inserted into a conventional aperture or opening pierced into the sheet metal defining a vehicle window opening using a minimal amount of force, but which, upon full insertion, engages the edges of the opening and is securely fastened thereto so that the fastening means cannot easily be extracted from the opening by exerting forces on the fastening means or sealing strip in a direction outward from the opening.

The foregoing and other objects and advantages of the invention are achieved by a weather sealing strip having a sealing element including a flexible sealing lip for wipingly and sealingly engaging a movable window pane of a vehicle window opening, and having one or more integrally formed thermoplastic retaining clips adapted for insertion into openings provided in a sheet metal member defining the window opening. The retaining clips have resilient compressible means for engaging the openings of the sheet metal member defining the window opening to securely hold the sealing strip in abutting relationship with the sheet metal member. The sealing strip with integral retaining means is preferably formed in a single molding operation, thereby significantly reducing the amount of equipment and number of steps required for fabrication of the sealing strip.

Another advantage of forming a molded thermoplastic sealing strip in accordance with the principles of the present invention is that conventional thermoplastic end caps which are generally needed to cover the exposed end of an extruded beltstrip are not required because aesthetic details can be integrally formed during the molding operation by providing an appropriately shaped mold cavity.

DESCRIPTION OF THE PREFERRED EMBODIMENTS

Figure 1:
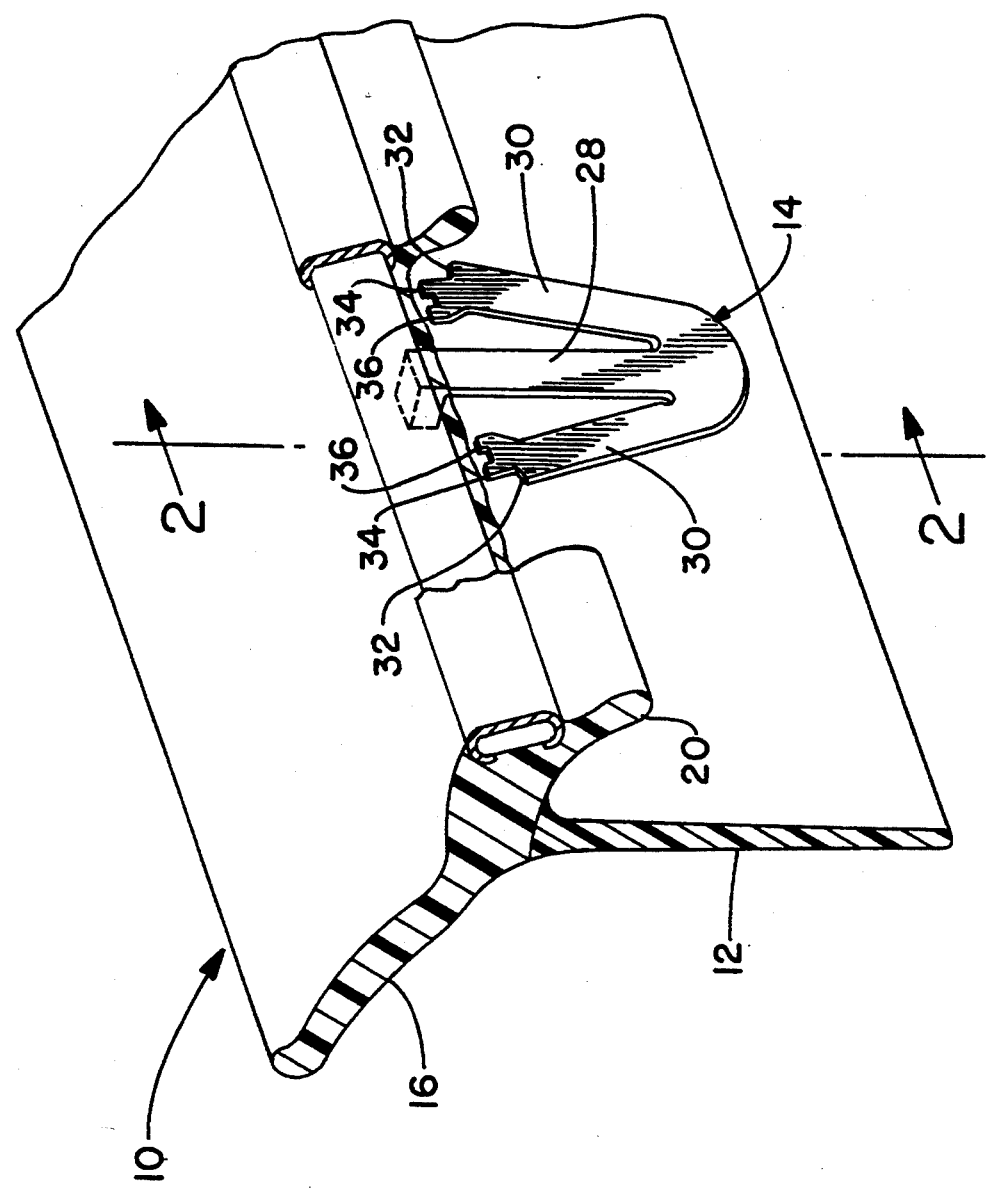
FIG. 1 is a perspective view of a sealing strip in accordance with a preferred embodiment of the invention, with a portion broken away to show details of one of the integral retaining clips.
Figure 2:
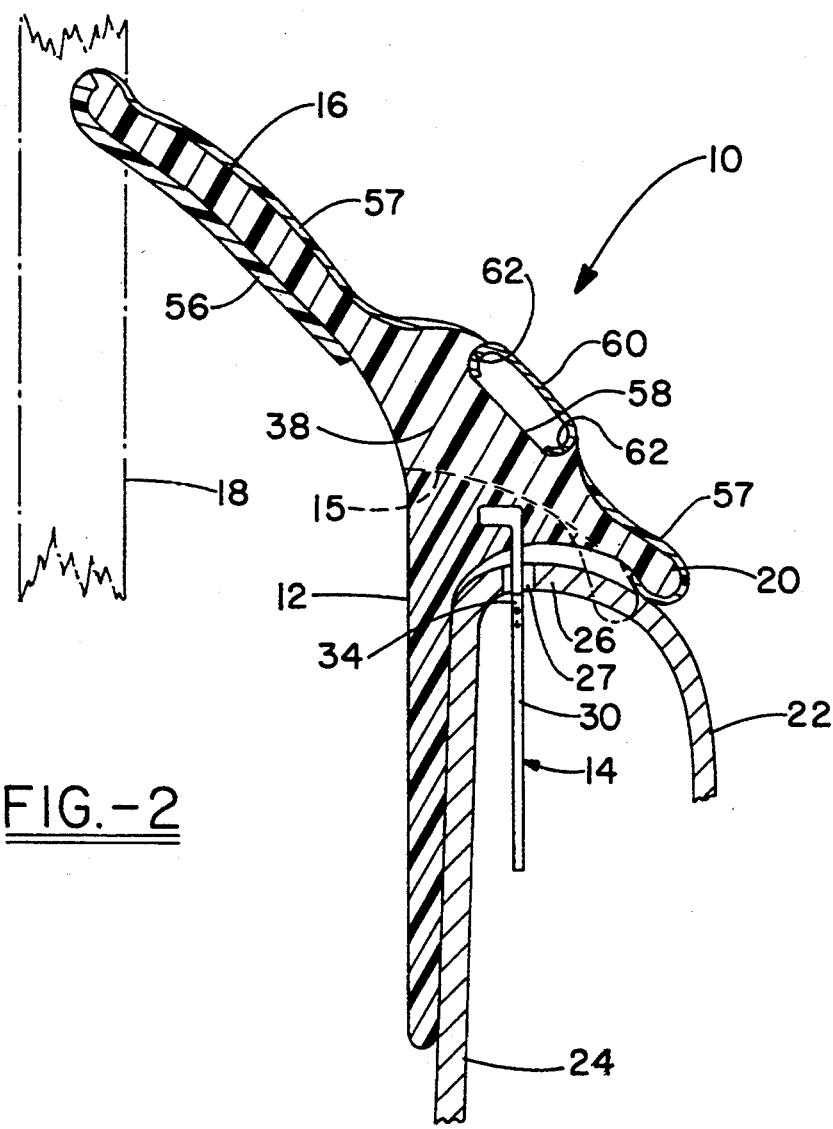
FIG. 2 is a cross-sectional view along lines 2—2 of FIG. 1 when the sealing strip is mounted to a metal sheet which forms an outer door panel for an automotive vehicle and which is bent or stamped inwardly and sharply downwardly to form a substantially horizontal surface defining the lower periphery of a window opening for a movable window.

A preferred embodiment of the sealing strip 10 of the invention is shown in FIGS. 1 and 2. The sealing strip includes a resilient, relatively rigid or semi-rigid, higher modulus thermoplastic backbone 12, and integrally formed retainer clips 14 which are also formed of the same relatively rigid or semi-rigid, higher modulus thermoplastic material. The sealing strip also includes a flexible sealing element or lip 16 which is made of a relatively lower modulus, thermoplastic elastomeric material and which wipingly and sealingly engages a movable window pane 18 (see FIG. 2) of an automotive vehicle. The backbone serves as a rigid base which extends the entire length of the weather sealing strip onto which the retaining clips are integrally formed, and to which the sealing lip 16 is joined. The dashed line 15 generally defines the boundary between the thermoplastic backbone 12 with integral retaining clip 14 made of a relatively rigid thermoplastic material and the flexible sealing element portion 16. In accordance with the preferred embodiment of the invention, the sealing strip has a second sealing element or lip 20 which is integrally formed with and of the same material as sealing lip 16. Sealing lip 20 is designed to provide for sealing engagement with an outer exposed portion of a metal sheet 22 which forms an outer door panel for an automotive vehicle. The metal sheet 22 is generally bent or stamped inwardly and sharply downwardly about an axis generally parallel with the longitudinal direction of the sealing strip after it is installed to the window opening, to form an inverted U-shaped channel between the outer exposed sheet and an inner downwardly depending leg 24. A narrow, substantially horizontal surface 26 at the top of the inverted U-shaped channel generally defines the lower periphery of the window opening. Along the length of the substantially horizontal surface 26 are provided a plurality of generally elongate rectangular openings or slots 27. The slots 27 along the horizontal surface 26 are sized and spaced apart from each other so that each of the plurality of retainer clips 14 of sealing strip 10 is capable of being inserted into, and securably engageable with, a corresponding one of the slots.

The long sides of the rectangular slots 27 are typically substantially parallel to the longitudinal direction of the installed sealing strip with the short sides of the slots being transverse thereto. Because the slots 27 are generally located at or near the bent area of metal sheet 22, the width dimension or distance between the long sides of the slots are typically subject to greater variations than the length dimension or distance between the short sides of the slots. Accordingly, while conventional clip configurations which engage the long sides of the slots 27 can be used, clips such as clip 14 shown in FIG. 1 which engage the short sides of the slots, are preferred.

A suitable integral retaining clip in accordance with the preferred embodiment of the invention has a downwardly depending central portion 28 and a pair of arms 30 which extend upwardly and outwardly in opposing directions from the bottom of the central portion.

The sealing strip 10 is fastened to the perimeter of the window opening by aligning the integral retaining clips 14 of the sealing strip with the corresponding slots provided along the horizontal surface 26, and subsequently applying a generally downwardly directed force to the sealing strip to cause the retaining clips to pass through the slot. When the retaining clips are nearly fully inserted into the slots, each of the two edges along the narrow sides of each of the elongate rectangular slots contacts a respective one of the two arms 30 of the corresponding retaining clip 14. As the sealing strip is pushed further downward, the arms 30 of each of the integral retaining clips is forced inwardly toward the central portion 28 until the clip is fully inserted, whereupon shoulders 32 slide past the edges of the corresponding slot and allow the arms to snap outwardly and slide under the edges of the slot to engage catch 34 of each arm, thereby locking the clip into position and securely fastening the sealing strip to the window opening. Fastening of the sealing strip of the invention to a window opening is thereby accomplished by a simple, two-step process of aligning the clips 14 with the corresponding slots in the window opening and then pushing the sealing strip downwardly.

In accordance with a preferred aspect of the invention, the upwardly and outwardly extending arms 30 of the integral retaining clips 14 are each provided with an upwardly projecting tab 36 which is spaced from catch 34 to allow for the insertion of a specially adapted tool, such as off-set type needle nose pliers, between tab 36 and catch 34 to allow for easy removal of the clip by applying laterally inwardly directed forces to both tabs simultaneously to force arms 30 inwardly toward central portion 28.

Figure 3:
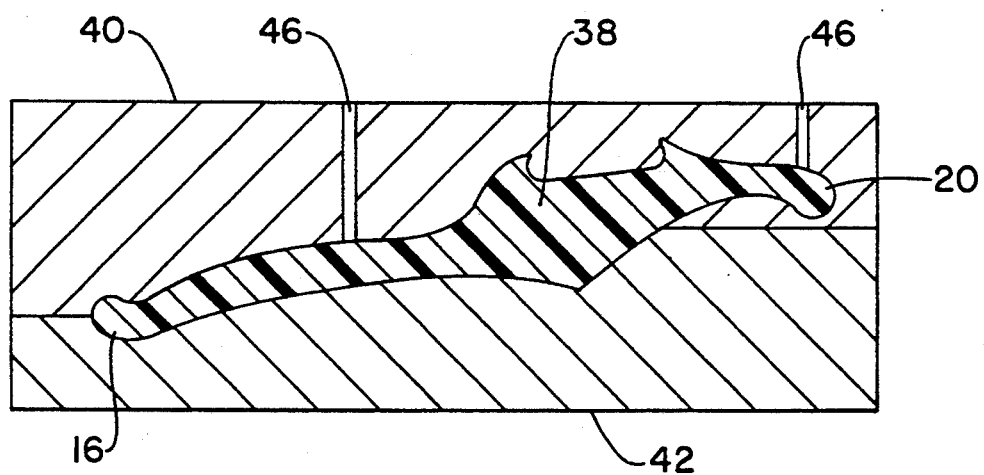
FIG. 3 is a transverse cross-section of a molding apparatus for forming the upper thermoplastic elastomer portion of the sealing strip of FIGS. 1 and 2 using a sequential injection molding technique.
Figure 4:
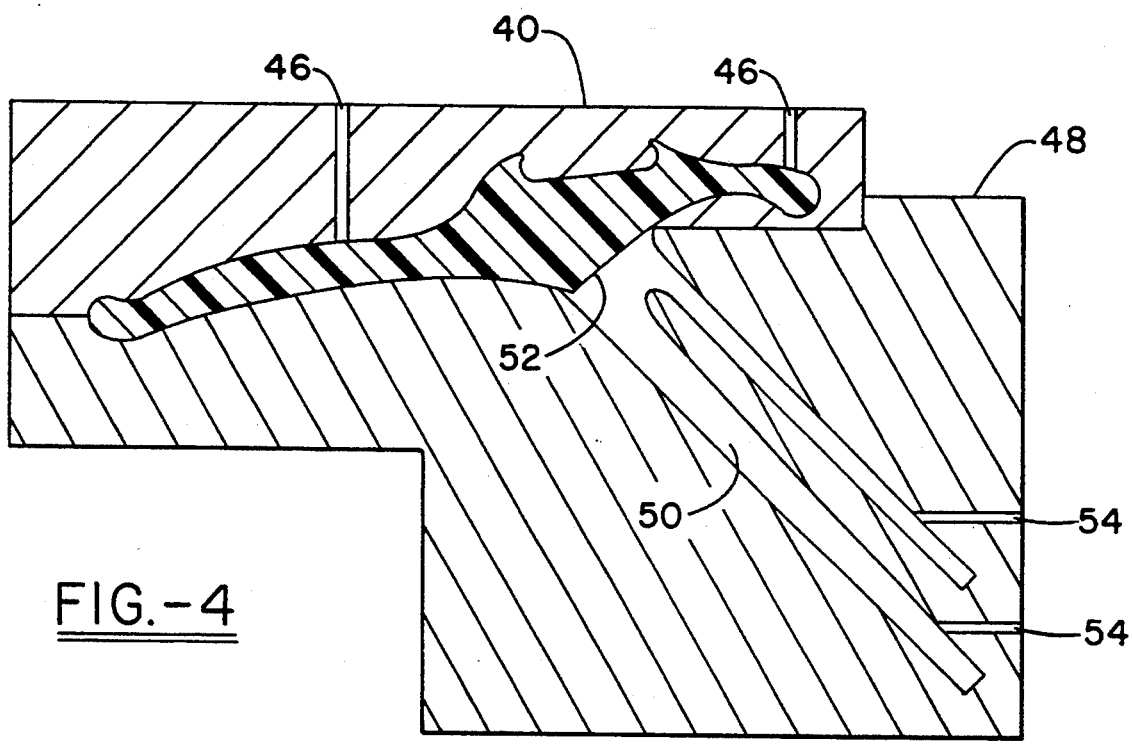
FIG. 4 is a transverse cross-section of a molding apparatus taken along a transverse plane cutting through a portion of the mold cavity used to form one of the integral retaining clips, the molding apparatus being suitable for either forming the lower relatively rigid thermoplastic portion of the sealing strip using a sequential injection molding technique or for forming the entire sealing strip using a simultaneous injection molding technique.

The sealing strip of the invention can be made, for example, by a sequential molding process utilizing a common upper mold die and two different lower mold dies. In FIG. 3, there is shown a transverse cross-section of a mold for forming the thermoplastic elastomer or upper portion of the sealing strip which comprises the sealing lips 16 and 20 and a connecting portion 38 bridging the two sealing lips together. The mold comprises an upper mold die 40 and a first lower mold die 42, which together define a mold cavity for forming the flexible, thermoplastic elastomer or upper portion of the sealing strip. The upper portion of the sealing strip is preferably formed by an injection molding process wherein the mold is closed and then a molten thermoplastic elastomer is pumped into the mold cavity through one or more conduits 46. The mold is then allowed to cool to bring the temperature of the thermoplastic elastomer below its melting point causing the upper portion of the sealing strip to form and solidify. The mold is then opened, with the upper portion of the sealing strip remaining adhered to and retained by the upper mold die 40, and separated from the lower mold die 42. The first lower mold die 42 is then shuttled away from the upper die and a second lower mold die 48 (shown in FIG. 4) is shuttled into position beneath the upper mold die 40. The mold comprising upper mold die 40 and second lower mold die 48 is then closed with the upper portion of the sealing strip still adhered to and retained by the upper mold die, thereby forming a mold cavity 50 whose boundaries are generally defined by the lower surface 52 of the upper portion of the sealing strip and by the internal walls of the second lower mold die 48. The lower portion of the sealing strip is then formed by injecting a molten thermoplastic material into mold cavity 50 through one or more conduits 54. The thermoplastic material used to form the lower portion of the sealing strip has a higher modulus and is relatively rigid upon solidification as compared with the upper thermoplastic elastomeric portion of the sealing strip. During the process of forming the sealing strip using the foregoing sequential molding technique, in order to conserve energy and accelerate the molding process, the upper portion of the sealing strip is kept at a temperature as near to the melting point of the thermoplastic elastomer material as possible during the time between the opening of the mold comprising upper mold die 40 and first lower mold die 42, and injection of the thermoplastic material into the mold cavity 50. On or about the same time as the thermoplastic material is being injected into mold cavity 50, the thermoplastic elastomer upper portion of the sealing strip is preferably heated above its melting point, at least in the vicinity of its lower surface 52, to cause some intermingling of the thermoplastic material with the thermoplastic elastomer material across the interface 52 to fuse the upper portion of the sealing strip to the lower portion of the sealing strip, thereby forming an integral one-piece sealing strip with integrally formed retaining clips. The interface of the sealing strip between the thermoplastic elastomer upper portion and the thermoplastic lower portion is preferably a region having some thickness with a gradual transition between pure thermoplastic elastomer and pure thermoplastic, rather than a sharply defined line.

In accordance with another preferred method of forming the sealing strip of the invention, a single upper die 40 and a single lower die 48 are used with both the thermoplastic elastomer material and the thermoplastic material being simultaneously injected through one or more conduits 46 and 54, respectively. For the simultaneous injection method, the number of conduits 46 and number of conduits 54, the size of conduits 46 and 54, and the flow rates of thermoplastic elastomer through conduits 46 and the flow rates of thermoplastic through conduits 54 are selected so that the sealing lips 16 and 20 are formed of a relatively flexible thermoplastic elastomer material while the backbone 12 and integral retaining clips are formed of a relatively rigid, higher modulus thermoplastic material, with the thermoplastic elastomer portions of the sealing strip being integrally fused to the relatively rigid thermoplastic portions of the sealing strip, preferably through an interface comprising a region having a thickness with a gradual transition between pure relatively elastic thermoplastic elastomer and pure relatively rigid thermoplastic across the thickness of the interface region.

In accordance with another aspect of the invention, the surface of the flexible sealing lip 16 which contacts the movable window pane 18 is provided with a low-friction surface treatment 56 as by spraying the glass contacting surface with a low-friction coating in a post-molding operation, or by applying a conventional adhesive and flock to the glass contacting surface in a conventional manner.

In accordance with a further aspect of the invention, the outer exposed surface of the sealing strip can be provided with a cosmetic surface coating 57 as by spraying a conventional cosmetic surface coating on the outer exposed surface of the sealing strip during a post-molding operation, or by utilizing conventional in-mold coating techniques using a meltable resinous in-mold coating composition, or by using a commercially available cosmetic in-mold coating tape.

Other optional cosmetic treatments can be used with the invention. For example, the upper relatively flexible thermoplastic elastomer portion of the sealing strip can be formed with a longitudinal concavity or groove 58 designed for retaining a metal or plastic cosmetic trim strip 60. The cosmetic trim strip 60 can be fixed to the groove 58 of the sealing strip 10 by a conventional adhesive layer 62.

Figure 5:
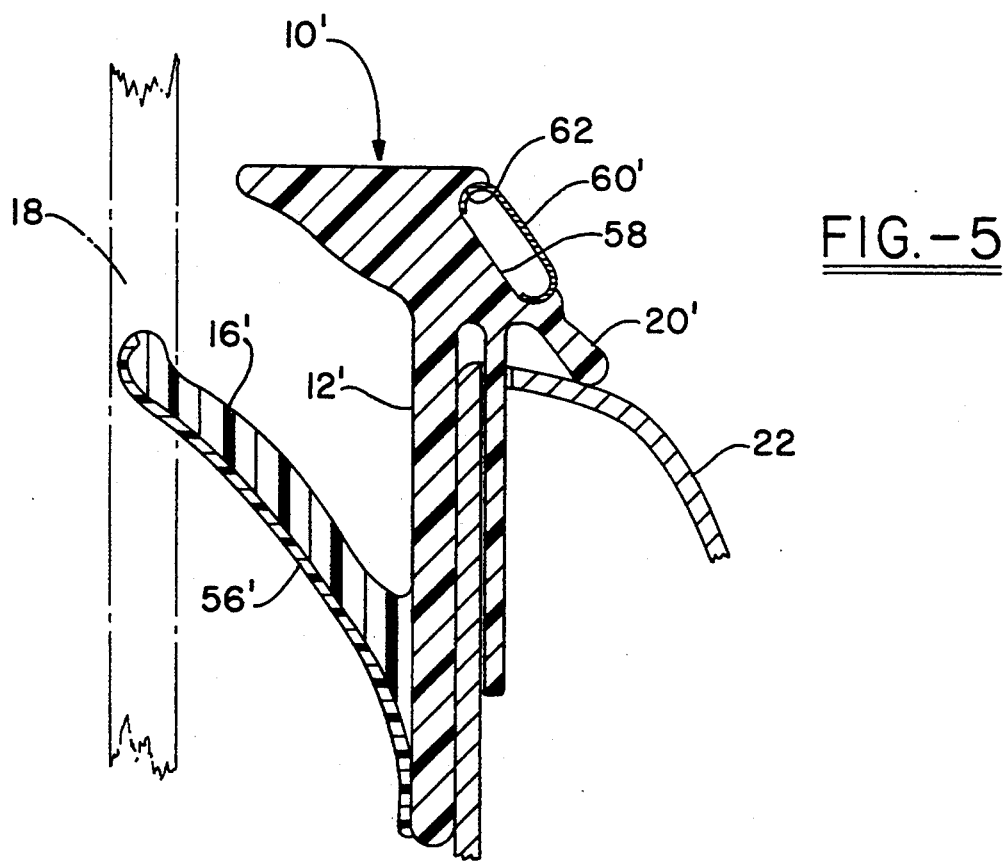
FIG. 5 is a transverse cross-section view of an alternative embodiment of the sealing strip in accordance with the invention.

An example of an alternative embodiment of the invention is shown in FIG. 5. The sealing strip of FIG. 5 is generally similar to that of the first embodiment shown in FIGS. 1 and 2, but has a pair of relatively flexible thermoplastic elastomer lips 16' and 20' which sealingly engage the window pane 18 and the outer exposed sheet metal 22, but which are not bridged to one another by a flexible thermoplastic elastomer connecting portion, as with the first embodiment of FIGS. 1 and 2, but instead are each separately fused to the relatively rigid thermoplastic backbone 12'. The sealing strip of FIG. 5 can be made by a sequential molding process using a multiple die molding apparatus wherein the lips 16' and 20' are formed separately and subsequently fused to the thermoplastic backbone 12' during the injection molding thereof. However, the alternative embodiment of the sealing strip shown in FIG. 5 is preferably formed in a two-die molding apparatus using a simultaneous injection molding technique wherein separate conduits are used for introducing a thermoplastic elastomer into separate regions of the mold cavity to form the lips 16' and 20', while a thermoplastic is injected through additional conduits to form the intervening backbone portion 12' of the sealing strip.

Suitable thermoplastic elastomers for forming the relatively flexible, lower modulus portions of the sealing strip, including the window pane sealing lip 16 and 16' and outer exposed sheet metal sealing lip 20 and 20', include ethylene-propylene-diene terpolymer, ethylene-propylene copolymer, as well as other polymeric thermoplastics having suitable elastomeric properties for serving the function of wipingly and sealingly engaging the surface of a movable window pane. Suitable relatively rigid thermoplastics for forming the backbone portion of the sealing strip of the invention include polyolefins such as polyethylene and polypropylene, as well as other known thermoplastics having sufficient rigidity to form a tough, reliable retaining clip and a durable support or base for fixedly supporting the sealing elements 16' and 20'.

Figure 6:
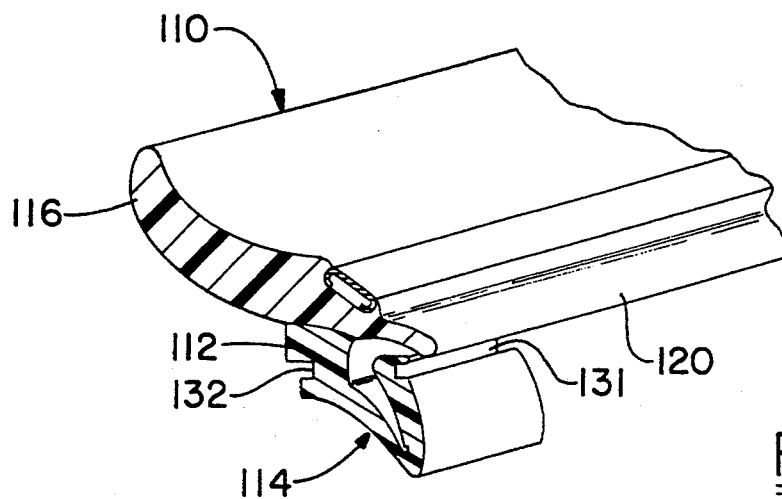
FIG. 6 is a perspective view of an alternative preferred embodiment of the sealing strip of the invention.
Figure 7:
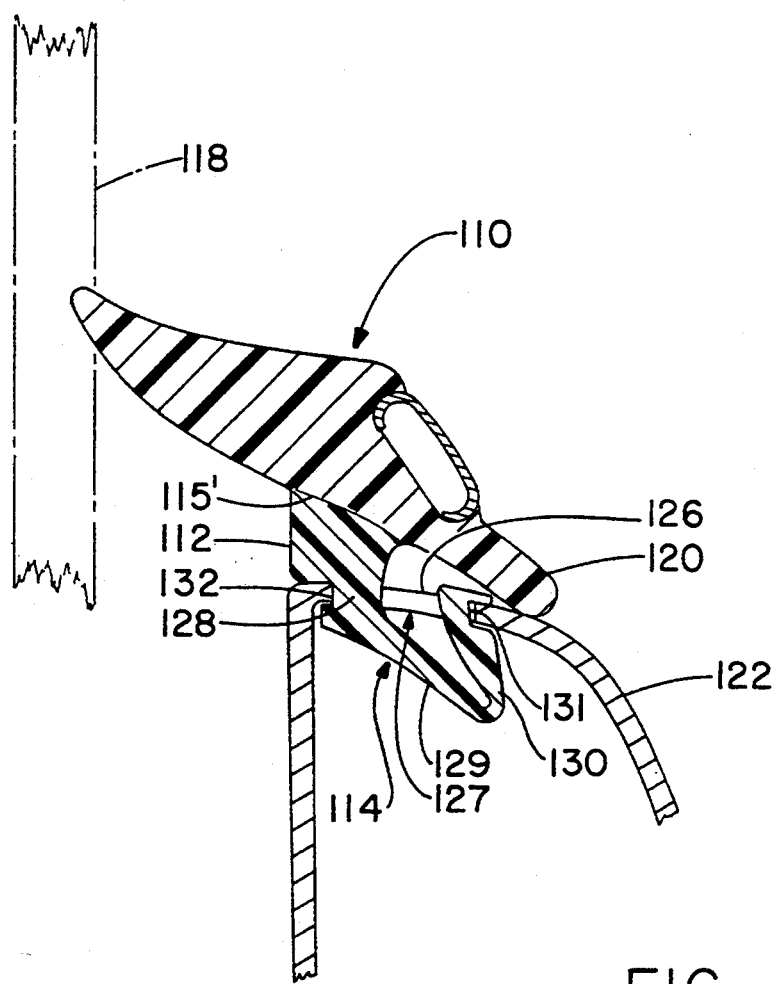
FIG. 7 is a side elevation in cross-section of the sealing strip of FIG. 6 mounted to a metal sheet which forms an outer door panel for an automotive vehicle.
Figure 8:
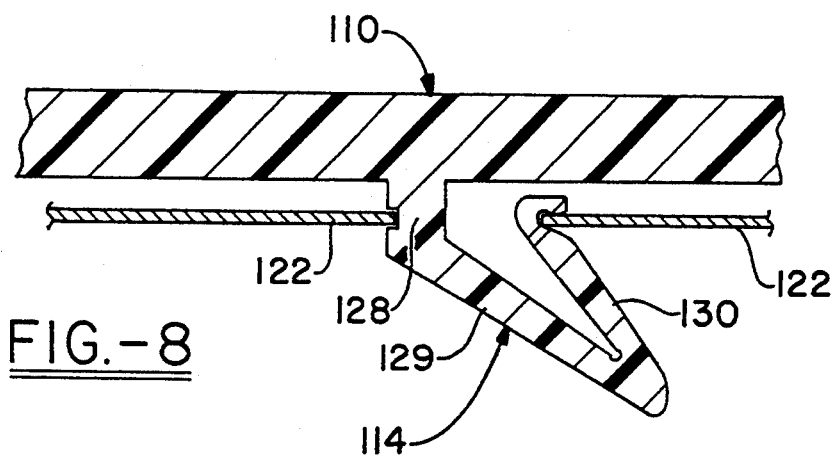
FIG. 8 is a side elevation in cross section of a portion of the sealing strip of FIGS. 6 and 7 showing details of the retaining clip.
Figure 9:
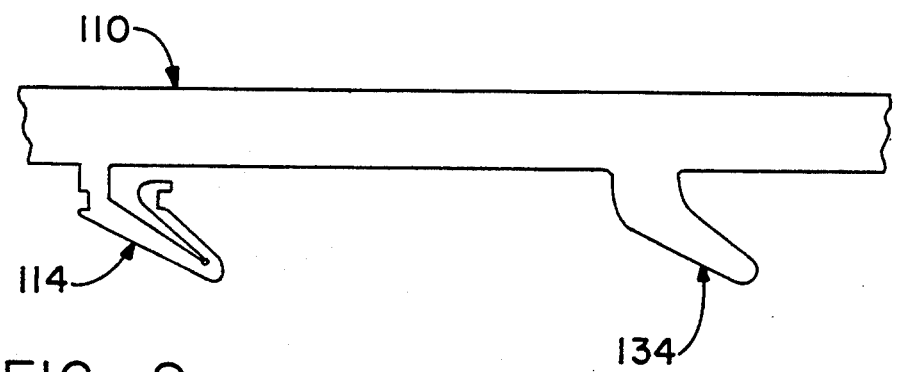
FIG. 9 shows a side view of a slightly modified embodiment of the sealing strip shown in FIGS. 6-8, wherein a single retaining clip is used in combination with a plurality of retainers.

In accordance with another preferred aspect of the invention, there is shown in FIGS. 6-8 an alternative embodiment of the weather sealing strip of the invention. In this alternative embodiment, weather sealing strip 110 includes a resilient, relatively rigid or semi-rigid, higher modulus thermoplastic backbone 112, and one or more integrally formed retaining clips 114 which are of the same relatively rigid or semi-rigid, higher modulus thermoplastic material. The sealing strip 110 includes a flexible sealing element or lip 116 which is made of a relatively lower modulus, thermoplastic elastomeric material and which wipingly and sealingly engages a movable window pane 118. The backbone 112 serves as a rigid base which extends the entire length of the weather sealing strip 110, and onto which the retaining clips 114 are integrally formed, and to which the sealing lip 116 is joined. The line 115' generally defines the boundary between the thermoplastic backbone 112 with integral retaining clips 114 made of a relatively rigid thermoplastic material and the sealing element 116 made of a lower modulus, relatively flexible material. A second sealing element or lip 120 can be integrally formed with the same material as sealing lip 116 to provide for sealing engagement with an outer exposed portion of a metal sheet 122 which forms an outer door panel of an automotive vehicle. A narrow, substantially horizontal surface 126 of sheet metal 122 defines the lower periphery of the window opening. A plurality of elongate rectangular openings or slots 127 are provided along the length of the horizontal surface 126. The slots 127 are sized and spaced apart from each other so that the plurality of clips 114 are capable of being inserted into and securely engageable with the slots.

The long sides of the rectangular slots 127 are typically substantially parallel to the longitudinal direction of the installed sealing strip with the short sides of the slots being transverse thereto. Because the slots 127 are generally located at or near the bent area of metal sheet 122, the width dimension or distance between the long sides of the slots are typically subject to greater variations than the length dimension or distance between the short sides of the slots. Accordingly, while conventional clip configurations which engage the long sides of the slots 127 can be used, clips such as clip 14 shown in FIG. 1 which engage the short sides of the slots, are preferred.

One major difference between the sealing clip of FIGS. 6-9 and that of FIGS. 1 and 2 is that clip 114 is slanted downwardly from the longitudinal direction of the sealing strip at an angle less than 90 degrees. Each clip 114 has a stem portion 128 which extends downwardly from the backbone portion 112 of the sealing strip, a downwardly slanted leg 129 which extends both downwardly and laterally away from the stem portion 128, and an upwardly slanting leg 130 which extends both upwardly and partially back toward the stem portion 128. Legs 129 and 130 together form a resilient V-shaped clip which protrudes from the sealing strip 110 at an angle along a line intermediate between the longitudinal direction of the sealing strip and a vertical line extending downwardly at a 90-degree angle from the longitudinal direction of the sealing strip. The leg 130 includes an indentation or groove 131 for engaging the edge of sheet metal 122 along a short side of rectangular slot 127. An indentation or groove 132 can also be provided on the stem portion 128 to engage the edge of the opposite slot opposite the edge engaged by groove 130 of the rectangular slot 127.

Each of a plurality of clips 114 for a sealing strip 110 can be substantially similar and all slanted or angled at the same direction relative to the sealing strip to allow for easy insertion and removal of the sealing strip. Alternatively, a simplified embodiment (shown in FIG. 9) includes, for example, a single, downwardly slanted or angled clip 114 and a plurality of retainers 134 which are downwardly slanted or angled in the same general direction as clip 114. The retainers 134 slide into rectangular apertures generally similar to slot 127 to prevent lateral movement of the strip upon installation into a vehicle window opening, but need not include resilient clip means or indentations for engaging the sides of the slots 127. To install the sealing strip 110, it is only necessary to align the knee area between the legs 129 and 130 of the clip 114 near or slightly backward of the center of the slot into which it is to be inserted, and then simultaneously push downwardly and in a forward direction substantially coincident with the direction from which the clips and/or retainers 134 project from the sealing element. The leg 130 will then deflect inwardly toward leg 129 with the forward edge of slot 127 sliding upwardly along the forward edge of leg 130 until the strip is fully inserted and indentation or groove 131 engages the formed edge of slot 127 and groove 132 engages the backward edge of slot 127 locking the sealing strip into its installed position. The sealing strip 110 is also easily removable by exerting force in the forward direction toward the slot edge engaging groove 131 thereby causing sufficient deflection of resilient clip 114 to enable disengagement of the slot edge engaging groove 132, and then simultaneously lifting upwardly and forwardly to remove the sealing strip. The rigidity of the backbone 112 in combination with the slanted orientation of the retaining clip(s) 114 and/or retainers 134 of the sealing strip 110 substantially requires that the retaining clip(s) and/or retainers 134 be inserted into or retracted from the sheet metal opening 127 substantially simultaneously during installation or removal, respectively.

Sealing strip 110 can be made generally using the same or similar materials used to make the previous embodiments of the sealing strip of the invention.

Figure 10:
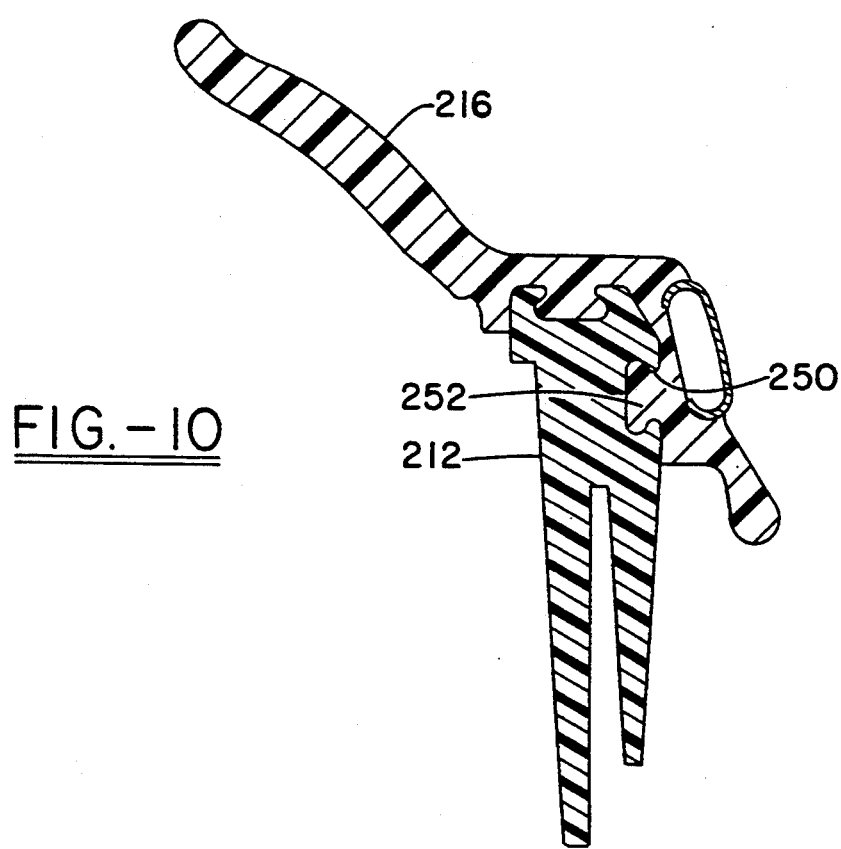
FIG. 10 is a cross-sectional view of a sealing strip illustrating an aspect of the invention wherein the backbone of the sealing strip and integral fastening means are formed together and joined to a separately formed sealing element.

In accordance with a further aspect of the invention, as shown in FIG. 10, any of the foregoing embodiments can be comprised of a separately formed relatively rigid thermoplastic backbone 212 or base having internally formed retaining clips, and a separately formed sealing element or lip 216 which are subsequently fused or bonded together. The backbone 212 with integrally formed retaining clips can be, for example, molded out of a relatively rigid, high modulus, thermoplastic material and the sealing element 216 can be either molded or extruded. The sealing element 216 and backbone 212 can then be joined together as by thermally fusing or conventional adhesive bonding techniques. The backbone 212 can include various protrusions 250 and/or indentations 252 which mate with complementary indentations, and/or protrusions respectively in the sealing element 216.

While in accordance with the Patent Statutes, a preferred embodiment and best mode has been presented, the scope of the invention is not limited thereto, but rather is measured by the scope of the attached claims.

What is claimed is:

1. A trim piece adapted to be attached to openings in a substrate surface of an object which is to be provided with a trim piece, said trim piece comprising:
a trim element; and
at least one fastening means, said fastening means being adapted for insertion into openings of a substrate surface of an object and having resilient compressible means for engaging said openings, said fastening means comprising a retaining clip, the retaining clip having a downwardly depending central portion and a pair of arms which extend upwardly and outwardly in opposing directions from the central portion, each of said arms having a shoulder near the top outward edge of the arm, said arms being resilient to permit the clip to slide past the edges of one of said corresponding openings in said substrate surface as the clip is forced into said opening and snap outwardly and slide under the edges of the opening to engage said shoulder thereby locking the clip into position and securely fastening the sealing strip to said substrate surface.

2. A trim piece in accordance with claim 1, wherein each arm of said at least one retaining clip further comprises an upwardly projecting tab which is spaced from said shoulder to allow for insertion of a tool therebetween to facilitate removal of the clip by applying laterally inwardly directed forces to both tabs simultaneously to force both arms inwardly toward the central portion of said retaining clip.

3. A trim piece in accordance with claim 1, wherein said trim element and said fastening means are of a relatively rigid thermoplastic, and further comprises a relatively flexible thermoplastic elastomeric portion integrally fused to the relatively rigid thermoplastic trim element through an interface region having a gradual transition between pure thermoplastic elastomer and pure thermoplastic.

4. A weather sealing strip for sealing the opening between the periphery of a vehicle window opening and a slidable window pane, and which is adapted to be attached to openings in a sheet metal member defining the window opening, said weather sealing strip comprising:
an elongate relatively rigid thermoplastic backbone;
a first relatively flexible elastomeric sealing element for wipingly and sealingly engaging a window pane, said sealing element being joined to said thermoplastic backbone; and
at least one thermoplastic fastening means, said fastening means being adapted for insertion into openings of a sheet metal member and having resilient compressible means for engaging said openings, said fastening means comprising a retaining clip, the retaining clip having a downwardly depending central portion and a pair of arms which extend upwardly and outwardly in opposing directions from the central portion, each of said arms having a shoulder near the top outward edge of the arm, said arms being resilient to permit the clip to slide past the edges of one of said corresponding openings in said sheet metal member as the clip is forced into said opening and snap outwardly and slide under the edges of the opening to engage said shoulder thereby locking the clip into position and securely fastening the sealing strip to said sheet metal opening.

5. A weather sealing strip in accordance with claim 4, further comprising a second relatively flexible thermoplastic elastomer sealing element for providing sealing engagement with an outer exposed portion of a metal sheet which forms an outer door panel for said vehicle.

6. A weather sealing strip in accordance with claim 4, wherein each arm of said at least one retaining clip further comprises an upwardly projecting tab which is spaced from said shoulder to allow for insertion of a tool therebetween to facilitate removal of the clip by applying laterally inwardly directed forces to both tabs simultaneously to force both arms inwardly toward the central portion of said retaining clip.

7. A weather sealing strip in accordance with claim 4, wherein the relatively flexible thermoplastic elastomeric portions of the sealing strip are integrally fused to the relatively rigid thermoplastic backbone through an interface region having a gradual transition between pure thermoplastic elastomer and pure thermoplastic.

8. A weather sealing strip in accordance with claim 7, which is formed by a sequential injection molding process.

9. A weather sealing strip in accordance with claim 7, which is formed by a simultaneous injection molding process.

10. A weather sealing strip in accordance with claim 4, wherein the surface of the flexible sealing element which engages the movable window pane is provided with a low friction surface.

11. A weather sealing strip in accordance with claim 10, wherein the low friction surface comprises a low friction polymeric coating.

12. A weather sealing strip in accordance with claim 10, wherein the low friction surface comprises flock adhesively bonded to said window pane engaging surface.

13. A weather sealing strip in accordance with claim 4, further comprising a cosmetic surface coating applied to the outer exposed surface of said sealing strip.

14. A weather sealing strip in accordance with claim 4, further comprising a cosmetic trim strip bonded to the outer exposed surface of said sealing strip.

15. A weather sealing strip in accordance with claim 4, wherein the backbone and integral fastening means are formed together and joined to a separately formed sealing element.

16. A weather sealing strip in accordance with claim 15, wherein at least one protrusion is formed in said backbone to mate with a complementary indentation in the sealing element.

17. A weather sealing strip in accordance with claim 15, wherein at least one indentation is formed in said backbone to mate with a complementary protrusion in the sealing element.

18. A weather sealing strip in accordance with claim 17, wherein at least one protrusion is formed in said backbone to mate with a complementary indentation in the sealing element.

19. A weather sealing strip for sealing the opening between the periphery of a vehicle window opening and a slidable window pane, and which is adapted to be attached to openings in a sheet metal member defining the window opening, said weather sealing strip comprising:

an elongate relatively rigid thermoplastic backbone;

a first relatively flexible elastomeric sealing element for wipingly and sealingly engaging a window pane, said sealing element being joined to said thermoplastic backbone; and at least one thermoplastic fastening means, said fastening means being adapted for insertion into openings of said sheet metal member and having resilient compressible means for engaging said openings, said fastening means comprising a retaining clip integrally formed with said thermoplastic backbone; said retaining clip having a stem which extends downwardly from the backbone, a downwardly slanting leg which extends both downwardly and laterally away from the stem, and an upwardly slanting leg which extends both upwardly and partially back toward the stem; said upwardly slanting leg having means for engaging an edge of an opening in a sheet metal member defining the window opening.

20. A weather sealing strip in accordance with claim 19, wherein the downwardly slanting leg and upwardly slanting leg together form a resilient V-shaped clip which protrudes from the backbone at an angle along a line intermediate between the longitudinal direction of the sealing strip and a vehicle line extending downwardly at a 90-degree angle from the longitudinal direction of the sealing strip.

21. A weather sealing strip in accordance with claim 20, wherein the means for engaging an edge of an opening in the sheet metal member defining the window opening includes a groove.

22. A weather sealing strip in accordance with claim 21, wherein said groove is located in said stem.

* * * * *